April 15, 1924.                    R. H. COMBS                    1,490,455
                                 ELECTRIC BATTERY
                              Filed April 20, 1921
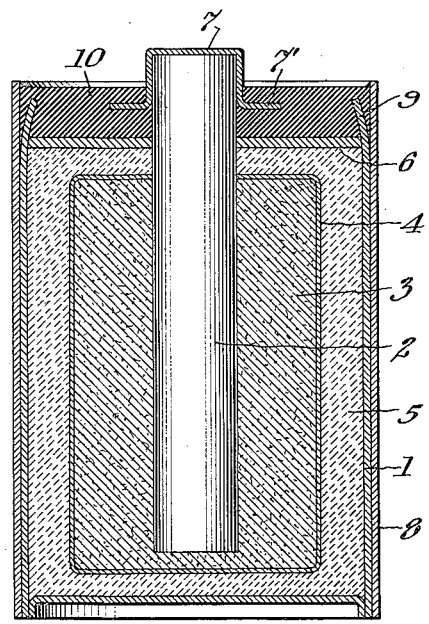

Patented Apr. 15, 1924.

1,490,455

UNITED STATES PATENT OFFICE.

ROBERT H. COMBS, OF TORONTO, ONTARIO, CANADA, ASSIGNOR TO NATIONAL CARBON COMPANY, INC., A CORPORATION OF NEW YORK.

ELECTRIC BATTERY.

Application filed April 20, 1921. Serial No. 463,083.

*To all whom it may concern:*

Be it known that I, ROBERT H. COMBS, a citizen of the United States, residing at Toronto, in the Province of Ontario and Dominion of Canada, have invented certain new and useful Improvements in Electric Batteries, of which the following is a specification.

My invention relates to electric batteries of the kind wherein one electrode is hollow and forms a part of the receptacle containing the other parts of the battery. Batteries of this construction usually have a seal of fusible material which acts as a closure for the receptacle and serves to hold the other parts of the battery in place. A protective jacket, usually of insulating material, ordinarily surrounds the hollow electrode.

An object of my invention is to improve the seal formed by the fusible material. Another object is to provide means for attaching the protective jacket to the battery so that it will remain in place, means for preventing displacement of the jacket being especially desirable when the latter is formed without a bottom, thus exposing a portion of the outer battery electrode to serve as a contact. In general, the purpose of the invention is to adapt the seal to better perform its function of supporting the parts of the battery.

A further object is to insulate the upper edge of the outer electrode so as to avoid accidental short-circuiting of the cell. Other objects will appear from the following description.

In the attached drawing my invention is shown embodied in a dry battery, but it will be understood that the invention is not limited to such application.

The drawing shows a longitudinal section of a dry cell having a zinc cup electrode 1, and a central carbon rod electrode 2. The carbon electrode is surrounded by a bobbin of depolarizing mix 3 having a wrapping 4. The space between the bobbin and the zinc is filled with electrolyte paste 5. In the zinc cup, above the bobbin, is placed a cardboard washer 6 which holds the carbon electrode in the center of the cup during a part of the construction of the cell. Other linings, wrappings, discs and washers of bibulous material may be used within the cell in any of the ways well understood in the art. The carbon electrode preferably is provided with a metal cap 7, which will be more particularly described.

Around the zinc cup is placed the protective jacket 8 which is formed, for example, of cardboard. As shown, the jacket comprises a tube, open at both ends and terminating at its lower end in the plane of the bottom of the zinc cup and at its upper end at a height intermediate the top of the cup and the top of the carbon rod, which latter extends above the zinc cup.

The upper end of the zinc cup has a contracted portion 9 which is formed by swaging or spinning the metal after the cell is assembled with the washer 6 and the parts below it. If desired, the contents of the zinc cup may be maintained under compression during the operation of turning in the zinc, so that the parts will be clamped tightly together.

The jacket 8 is slipped into its final position on the zinc after the latter has been contracted at its top. Molten insulating material, such as pitch, is then poured into the top of the jacket until it is completely filled as shown at 10, only the top of the carbon electrode protruding above it. When the seal has hardened, all the parts including the jacket will be firmly attached together. The seal will be so locked to the top of the zinc that it cannot possibly come out without being broken and the adhesion of the seal to the jacket will serve to prevent any movement of the latter. The top of the zinc will be completely covered and insulated, thus avoiding any accidental short-circuiting of the cell, as by bridging from the carbon to the edge of the zinc by the zinc of another cell during shipping. The manner in which the seal encompasses the edge of the zinc cup precludes any possibility of leakage at this point.

The carbon electrode cap 7 is provided, as shown, with a projecting flange 7' flared away from the carbon and having its outer edge encompassed by the material of the seal. This construction adds much to the stability of the cell, since the cap is held against movement as long as the seal remains unbroken, and the carbon is firmly attached to the cap.

I claim:

1. In an electric battery, a hollow electrode having an end of reduced diameter, a jacket around said electrode and spaced from said reduced end and extending beyond it, and a seal encompassing the edges of the reduced end and adhering to said jacket.

2. In an electric battery, a hollow electrode having a tapered end, a jacket surrounding said electrode and spaced from said tapered end and extending beyond it, and a seal encompassing the edges of the reduced end and adhering to said jacket.

3. In an electric battery, a tubular electrode, a tubular jacket conforming to said electrode throughout the greater part of its length, said electrode curving away from said jacket at one end to form a channel, and a seal of fusible material within the channel, and in contact with said jacket.

4. In an electric battery, a tubular electrode having an upper end of reduced diameter, a second electrode contained therein and protruding from said upper end, a jacket surrounding said tubular electrode and terminating intermediate its upper end and the end of the protruding electrode, said jacket conforming to said tubular electrode throughout the greater portion of its length but being spaced from the reduced end, and a seal filling the upper end of said jacket and being in part inside and in part outside of the tubular electrode.

In testimony whereof, I affix my signature.

ROBERT H. COMBS.